US009383920B2

United States Patent
Lee (10) Patent No.: US 9,383,920 B2
(45) Date of Patent: Jul. 5, 2016

(54) METHOD FOR CONTROLLING TWO OR THREE DIMENSIONAL FIGURE BASED ON TOUCH AND APPARATUS THEREOF

(71) Applicant: Samsung Electronics Co., Ltd, Gyeonggi-do (KR)

(72) Inventor: Sanghee Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 14/142,645

(22) Filed: Dec. 27, 2013

(65) Prior Publication Data

US 2014/0189609 A1      Jul. 3, 2014

(30) Foreign Application Priority Data

Dec. 28, 2012   (KR) .................. 10-2012-0155838

(51) Int. Cl.
*G06F 3/033*   (2013.01)
*G06F 3/0488*   (2013.01)
*G06T 11/60*   (2006.01)

(52) U.S. Cl.
CPC ............ *G06F 3/04886* (2013.01); *G06T 11/60* (2013.01)

(58) Field of Classification Search
CPC .................................................. G06F 3/04883
See application file for complete search history.

(56) References Cited

U.S. PATENT DOCUMENTS

| | | | |
|---|---|---|---|
| 5,396,590 A * | 3/1995 | Kreegar | G06F 3/04845 345/163 |
| 5,513,309 A * | 4/1996 | Meier et al. | 715/860 |
| 5,861,886 A * | 1/1999 | Moran et al. | 715/863 |
| 6,401,237 B1 * | 6/2002 | Ishikawa | 717/113 |
| 7,503,015 B2 * | 3/2009 | Chen | G06F 3/0488 715/268 |
| 8,169,421 B2 * | 5/2012 | Wright et al. | 345/179 |
| 2009/0138830 A1 * | 5/2009 | Borgaonkar et al. | 715/863 |
| 2011/0074698 A1 * | 3/2011 | Rapp et al. | 345/173 |
| 2014/0129990 A1 * | 5/2014 | Xin et al. | 715/849 |

* cited by examiner

*Primary Examiner* — Omar Abdul-Ali (57) ABSTRACT

A method for controlling a figure based on a touch includes recognizing a figure which is input by handwriting on a touch screen, displaying one or more variable points to which a controlling function of a figure is mapped on a trajectory of the recognized figure, detecting a touch input that selects one of the variable points, determining whether a controlling function execution request of the recognized figure is detected based on at least one of a pressure information and a touch gesture information corresponding to the detected touch input, and executing the controlling function of the figure corresponding to the selected variable points when the controlling function execution request is detected.

20 Claims, 9 Drawing Sheets

METHOD FOR CONTROLLING TWO OR THREE DIMENSIONAL FIGURE BASED ON TOUCH AND APPARATUS THEREOF

CROSS-REFERENCE TO RELATED APPLICATION(S) AND CLAIM OF PRIORITY

The present application is related to and claims the benefit under 35 U.S.C. §119(a) of a Korean patent application filed on Dec. 28, 2012 in the Korean Intellectual Property Office and assigned Serial No. 10-2012-0155838, the entire disclosure of which is hereby incorporated by reference.

TECHNICAL FIELD

The present disclosure relates to a method and an apparatus for controlling a figure which is displayed on a screen of a portable terminal, and more particularly, to a method and an apparatus for recognizing a depressurization of a touch, and controlling a figure which is displayed on a screen by using various touch movements.

BACKGROUND

As communication technology is developed, portable terminals (e.g., smart phones, tablet PCs, and the like) are being widespread. The portable terminal provides an integrated user's function by adding various functions besides a voice call, a text call, and an image call service. Recently, advances in a portable terminal equipped with a touch screen are being developed. The portable terminal equipped with the touch screen is an input device as well as a display device performing an input and a display of the information in one screen.

Some portable terminals provide a pen such as a stylus pen as an input tool besides a touch using a user's finger. In operating the portable terminal, the user may use the more detailed touch by using a pen input means. Using a touch pen, a user may select and operate a specific area of a display unit which supports for a touch function more delicately since the pen has a pen tip which is sharper than a finger. Therefore, a method of increasing the user's convenience is developed by providing more various functions by using the touch pen.

SUMMARY

To address the above-discussed deficiencies, it is a primary object to provide a method and an apparatus for recognizing a figure which is drawn on a screen, and controlling a figure which can increase fun and convenience to the user as well as increase an operability of the terminal by controlling the recognized figure with various touch pen movements.

In accordance with an aspect of the present disclosure, a method for controlling a figure includes recognizing a figure which is input by handwriting on a touch screen, displaying one or more variable points to which a controlling function of a figure is mapped on a trajectory of the recognized figure, detecting a touch input that selects one of the variable points, determining whether a controlling function execution request of the recognized figure is detected based on at least one of a pressure information and a touch gesture information corresponding to the detected touch input, and executing the controlling function of the figure corresponding to the selected variable points when the controlling function execution request is detected.

In accordance with another aspect of the present disclosure, an apparatus for controlling a figure includes: a touch screen configured to detect a handwriting input during operation of an editor mode, and display an input effect corresponding to the handwriting input; and a controller configured to control to recognize a figure input by a handwriting on the touch screen, display one or more variable points to which a controlling function of a figure is mapped on a trajectory of the recognized figure, detect a controlling function execution request of the recognized figure based on at least one of a pressure information and a touch gesture information corresponding to a touch input when a touch input that selects one of the variable point is detected, and execute the controlling function of the figure corresponding to the selected variable point in response to the function execution request.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

A method and an apparatus for controlling a figure according to the present disclosure may be applied to a portable terminal. It is obvious that such a portable terminal may be a smart phone, a tablet PC, a hand-held PC, a Portable Multimedia Player (PMP), and a Personal Digital Assistant (PDA). In the following description, it will be assumed that a method and an apparatus for controlling a figure according to the present disclosure are applied to a portable terminal.

Figure 1:
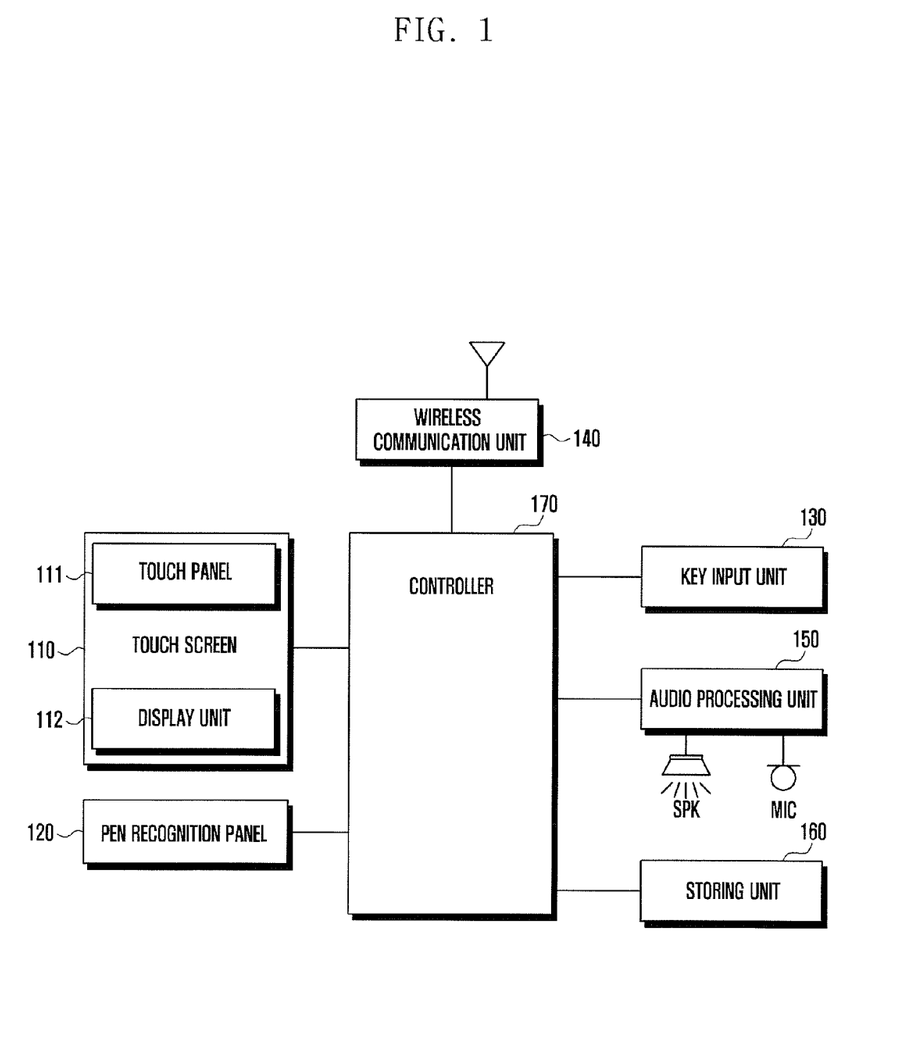
FIG. 1 is a block diagram illustrating a configuration of a portable terminal according to an embodiment of the present disclosure.

FIG. 1 is a flowchart illustrating a configuration of a portable terminal according to an embodiment of the present disclosure.

Referring to FIG. 1, the portable terminal 100 may be configured to include a touch screen 110 which is configured to include a touch panel 111 and a display unit 112, a pen recognition panel 120, a key input unit 130, a wireless communication unit 140, an audio processing unit 150, a storing unit 160, and a controller 170.

The touch screen 110 includes the touch panel 111 and the display unit 112. The touch screen 110 displays a screen according to a user's function execution, and detects a touch event related to the user's function control. The touch panel 111 is placed on the display unit 112. In particular, the touch panel 111 may be implemented as an add-on type which is located on a front of the display unit 112 or an on-cell type or an in-cell type which is inserted within the display unit 112.

A size of the touch screen 110 may be determined by a size of the touch panel. The touch panel 111 generates an analog signal (e.g., a touch event) in response to the user's input information (e.g., a user's gesture) corresponding to the touch panel 111, and delivers to the controller 170 after A/D converting the analog signal.

Here, the touch event includes touch coordinate (X, Y) information. When the touch event is received from the touch screen 110, the controller 170 determines that a touch tool (e.g., a finger or a pen) is touched to the touch screen 110, and when the touch event is not received from the touch screen 110, then determines that the touch is released. In addition, when the touch coordinate is changed, the controller 170 determines that the touch is moved, and calculates a position variation of the touch and a movement speed of the touch in response to the movement of the touch. The controller 170 distinguishes the user's gesture based on the touch coordinate, the touch release, the touch movement, the position variation of the touch, and the movement speed of the touch. The user's gesture may include a touch, a multi touch, a tap, a double tap, a long tap, a tap & touch, a drag, a flick, a press, a long press, a pinch in, and a pinch out.

In addition, the touch screen 110 may detect a pressure of the touched point by equipping a pressure sensor. The detected pressure information is delivered to the controller 170 and distinguishes the touch and the press. A resistive type, a capacitive type, and an electromagnetic induction type may be applied to the touch panel 111.

Under the control of the controller 180, the display unit 112 converts an image data input from the controller 180 into the analog signal to display. In other words, the display unit 112 may provide various screens according to the usage of the portable terminal, for example, a lock screen, a home screen, an application (hereinafter referred to as an "App") execution screen, a menu screen, a keypad screen, a message writing screen, and an internet screen. The display unit 112 may be formed as a type of a flat panel display unit such as a Liquid Crystal Display (LCD), an Organic Light Emitted Diode (OLED), and an Active Matrix Organic Light Emitted Diode (AMOLED).

The display unit 112 may display a screen according to an editor mode entry which is able to support a handwriting for a figure and a character. The portable terminal 100 supports a figure recognition function recognizing a figure which is drawn on the screen at the time of operating in the editor mode. In particular, the display unit 122 may display one or more variable points corresponding to a specific function routine to the trajectory of the recognized figure. Under the control of the controller 170, the display unit 112 may change and display one of a size, a shape, a style, a color, an effect, a length, a movement, an addition, and a deletion of the figure recognized according to the function execution at the time of a function execution request corresponding to the specific variable point.

The pen recognition panel 120 receives pen state information according to an access of the touch pen or a controlling of the touch pen, and delivers thereof to the controller 170. In addition, the pen recognition panel 120 receives a gesture recognition information according to the gesture movement of the touch pen, and delivers thereof to the controller 170. The pen recognition panel 120 is placed on a certain location of the portable terminal 100, and may have an activation state according to a specific event generation or a default. A size of the pen recognition panel 120 may be determined as a size of a display area of the display unit 112. The pen recognition panel 120 receives a position value of the touch pen according to the access and the controlling of the touch pen, and delivers thereof to the controller 170. For example, when the touch pen is configured as an electromagnetic induction device, the pen recognition panel 120 collects an electromagnetic induction value corresponding to the referred interval respectively according to the access interval of the touch pen, and delivers thereof to the controller 170. Here, the delivered electromagnetic induction value may be a pen state information, that is, the information for determining whether the touch pen is in state of hovering which is separated for a certain interval from the pen recognition panel 120, the display unit 112 or the touch panel 111, or whether it is in state of contacting to the display unit 112 or the touch panel 111. The touch pen may be designed as a structure receiving information of the corresponding touch pen when the touch pen is configured as another design method besides the electromagnetic induction method, however, it is not limited thereto.

In particular, the pen recognition panel 120 receives a decompression or pressurization information according to the pressure which is applied to the touch pen, and may deliver thereof to the controller 170. For example, the user may write a figure and a character with a handwriting input by applying various pressures using the touch pen. The touch pen delivers the pressure information which is applied to the touch pen to the controller. The controller 170 controls the display unit 112 so that a font, a thickness, or a color of a letter which is inserted by the touch pen is output as a converted form according to the pressure information received from the touch pen. In other words, the user may perform the conversion of the various thicknesses or the various fonts of the letter, character and an image drawing automatically by controlling the pressurization size of the touch pen.

The key input unit 130 receives number or character information, and includes a plurality of input keys and the function keys to set various functions. The function keys may include an arrow key, a side key, and a shortcut key which are set to perform the specific function. In addition, the key input unit 130 generates a key signal related to the user's setting and the function control of the portable terminal 100, and delivers thereof to the controller 170. The key signal may be divided into a power on/off signal, a volume control signal, and a screen on/off signal. The controller 170 may control the elements in response to such key signal. In addition, the key input unit 130 may include a QWERTY keypad which includes a plurality of keys, a 3*4 keypad, and a 4*3 keypad. Also, when the touch panel 111 of the portable terminal 100 is supported as a full touch screen type, the key input unit 130 may include at least one side key for a screen on/off, a portable terminal on/off, and the like, which is formed on the case side of the portable terminal 100.

The wireless communication unit 140 performs a communication of the portable terminal 100. The wireless communication unit 140 performs a communication such as a voice communication, an image communication, and a data communication by forming a communication channel in which a supportable mobile communication network is set. The wireless communication unit 140 may include a wireless frequency transmission unit which performs up conversion and amplification of a frequency of the transmitted signal, and a receiving unit which performs low noise amplification and down conversion of a frequency of a received signal. In addition, the wireless communication unit 140 may include a mobile communication module (e.g., 3-Generation mobile communication module, 3.5-Generation mobile communication module, or 4-Generation mobile communication module, etc.), and a digital broadcasting module (e.g., a DMB module).

The audio processing unit 150 transmits audio data such as a voice input from the controller 170 to the speaker (SPK) by converting from Digital into Analog (DA), and delivers an audio data such as a voice input from the microphone (MIC) to the controller 170 by converting from Analog into Digital (AD). The audio processing unit 150 may be configured by a codec (coder/decoder), and the codec may include a data codec which processes packet data and an audio codec which processes an audio signal such as a voice. The audio processing unit 150 plays the received digital audio signal through the speaker by converting the digital audio signal into the analog signal through the audio codec. The audio processing unit 150 delivers the analog audio signal which is input from the microphone to the controller 170 by converting the analog audio signal into the digital audio signal through the audio codec.

The storing unit 160 stores various data which are generated from the portable terminal, as well as an Operating System (OS) and the various applications ("Apps") of the portable terminal 100. The data may include data generated in the execution of an application of the portable terminal and all type of data which are generated by using the portable terminal or storable after receiving from an external device (e.g., external server, another portable terminal, or a personal computer). The storing unit 160 may store various set information corresponding to the user's interface and the portable terminal function processing which are provided from the portable terminal.

In particular, the storing unit 160 may store a figure recognition program, however, it is not limited thereto, and may store a numerical formula recognition program and a text recognition program. The figure recognition program deciphers the figure by analyzing the trajectory according to the touch input controlling, and may be used to correct thereof. To this end, the storing unit 160 may store various statistical models, a figure recognition result, and a figure correction condition for the figure recognition in association with the figure recognition program.

In addition, in order to control the figure, the storing unit 160 may store a touch gesture table corresponding to the controlling function information and a function execution command of the figure which are mapped to one or more variable points that are output on the trajectory of the figure.

The controller 170 controls an overall operation of the portable terminal 100 and a signal flow between the internal elements of the portable terminal 100, and performs a data processing function. The controller 170 controls a power supply to the internal elements from a battery. When the power is supplied, the controller 170 controls a booting procedure of the portable terminal 100, and executes various application programs which are stored in a program area for the function execution of the portable terminal 100 according to the user's setting.

Hereinafter, a detailed description of a specific function of the controller is described with reference to the accompanying drawings.

Figure 2:
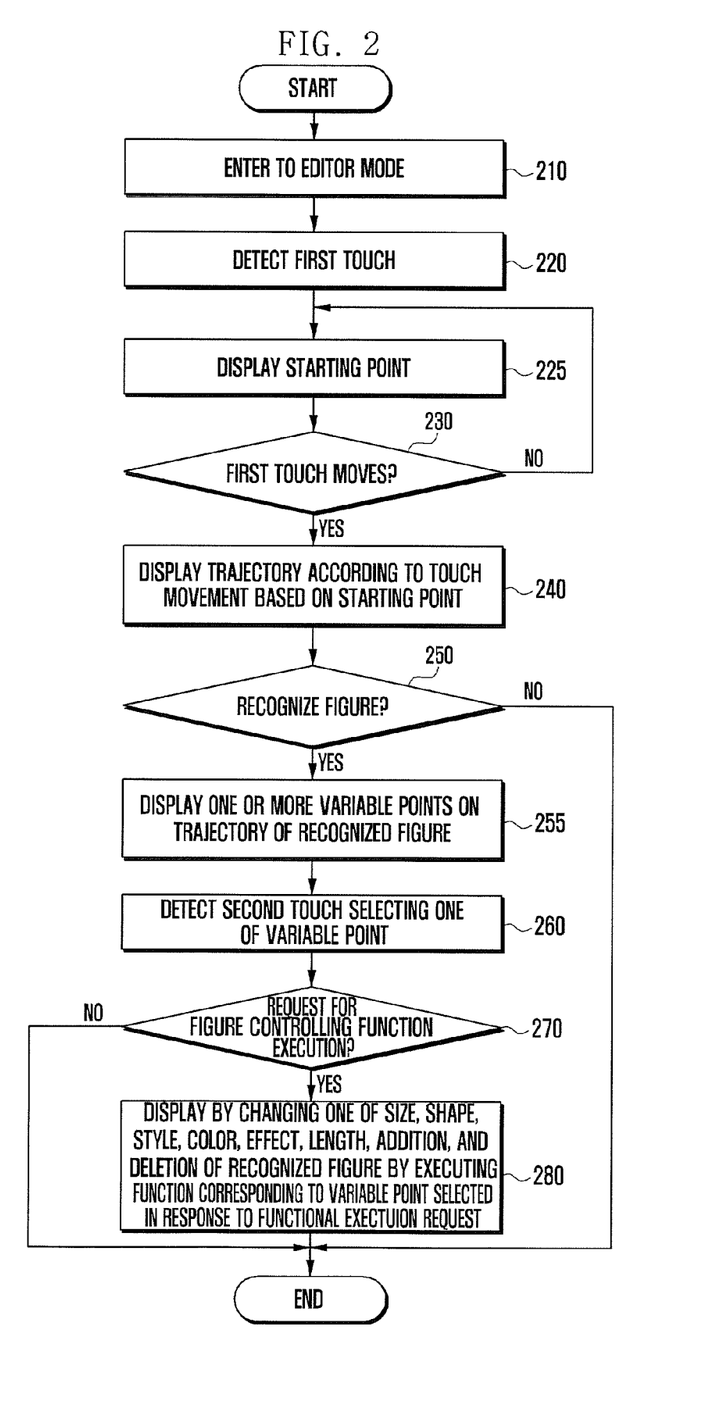
FIG. 2 is a flowchart illustrating a method for controlling a figure according to an embodiment of the present disclosure.

FIG. 2 is a flowchart illustrating a method for controlling a figure according to an embodiment of the present disclosure.

The portable terminal according to an embodiment of the present disclosure includes a pen which is detectable for a depressurization or pressurization, and may provide a certain touch function by interworking with the touch pen. In other words, the portable terminal 100 generates various commands according to the pressure (e.g., a pen pressure) and the touch pen gesture which are applied by the touch pen, and may support for the user's function according to the generated commands.

Referring to FIG. 2, the controller 170 may operate an operation mode as an editor mode (operation 210). The controller 170 displays a handwriting input screen on the display unit 112 when the editor mode is activated. The editor mode refers to the handwriting input mode which may input a message directly as doing the writing on a note by using a touch input means (e.g., a touch pen or a finger). The controller 170 may control the pen recognition panel to be activated to operate the touch pen function in the editor mode.

The portable terminal 100 supports one or more functions among a text recognition, a figure recognition, a numerical formula recognition, and a graph recognition in the editor mode. In particular, the editor mode may be activated in situations where a text may be input such as a memo, a text message writing, and a scheduler.

In the editor mode, the touch input means may be any one of the touch pen or a finger. Hereinafter, the touch input means of the user in an embodiment of the present disclosure is explained under an assumption that it is the touch pen; however, it is not limited thereto.

The controller 170 detects a first touch input in the editor mode (operation 220). For example, the touch screen 110 generates a touch event in response to the first touch input of the user, and delivers thereof to the controller 170. Here, the touch event includes a touch coordinate (x1, y1).

The controller 170 extracts the touch coordinate corresponding to the first touch input, and displays a starting point of the first touch input on the display unit (operation 225). The controller 170 determines whether the first touch input moves (operation 230). For example, when the touch coordinate is changed from (x1, y1) to (x2, y2), the controller 170 determines that a first touch of the user is moved.

When the first touch is moved, the controller 170 displays a trajectory on the display unit 112 according to the movement based on the starting point of the touch in response to the touch movement (operation 240). The controller 170 may store an input data of the touch which is changed according to the movement of the first touch input. The controller 170 may calculate a position variation of the touch and a movement speed of the touch in response to the movement of the touch.

The controller 170 determines whether the figure is recognized based on the displayed trajectory (operation 250). Here, a recognition function of the figure can be executed by selecting a separate figure recognition function menu by the user, and the figure recognition may be executed when the movement of the first touch is terminated, however, it is not limited thereto. For example, after a touch input signal is detected in the editor mode, when the selection input of the figure recognition function execution menu is detected, the controller 170 delivers the touch input data to a figure recognition engine. In addition, when a release of the first touch is detected while displaying the trajectory according to the touch movement, or when the position change of the first touch input is maintained during a preset time, the controller 170 may deliver the input data of the touch to the figure recognition engine.

The figure recognition engine deciphers the trajectory which is displayed on the display unit 112 through the touch input data. When a figure pattern which is similar to the deciphered image exists, the figure recognition engine recognizes the figure by converting a coordinate value of the input data of the touch into a vector information of a similar figure pattern, and delivers thereof to the controller 170. In other words, when the user draws a shape similar to a square by using the touch pen, the controller 170 may recognize the shape which is drawn similar to a square as the square. This is only one example, and the figure recognition engine may recognize the figure drawn on the screen with the various methods besides the above described method. The controller 170 may determine whether the figure is recognized based on a determination of the figure recognition engine.

When the figure is recognized, the controller 170 displays one or more variable points on the trajectory of the recognized figure (operation 255). Here, when there is an error on the coordinate value of the recognized figure, the controller 170 displays the figure on the display unit 112 by correcting based on a standard value. The controller 170 may control the variable point to be displayed on a contact point of the figure or an outline of the figure. Here, an interval between the variable points may be equal; however, it is not limited thereto.

The function of the variable point which is displayed on the trajectory of the figure may be mapped to control the figure corresponding to each variable point. For example, when the square figure is recognized in the handwriting mode, the controller 170 may output at least 8 variable points among the contact points of the square and the middle points between the contact points. In this case, the controlling function, for example, at least one of an addition of the figure, a shape change, a style change, an effect change, a color change, a rotation of a figure, a third-dimensional change, a length change, a text input addition function, a movement, and a deletion may be mapped in eight variable points. The controlling function of the figure according to an embodiment of the present disclosure is not limited to the above described functions, and all functions for operating or changing the figure may be included.

The controller 170 detects a second touch input selecting one of the variable points of the figure (operation 260). Here, the input means of the second touch may be the touch pen, however, it is not limited thereto.

The controller 170 determines whether the figure controlling function execution request corresponding to the variable point which is selected by the second touch is detected (operation 270). The controller 170 may determine whether the figure controlling function execution request based on one or more information among the pressure information of the second touch and the touch gesture information selecting one of the variable point is detected.

In detail, the figure controlling function execution routine may be one of the cases when a certain period of time is maintained after applying a pressurization to the second touch selecting the variable point, when a specific gesture corresponding to the second touch is detected, and when the specific gesture is detected after applying a pressurization to the second touch.

As an example, a shape change function of the figure is mapped by corresponding to the specific variable points, and the up and down movement gesture may be mapped after a function execution command pressurizes to the touch. In this case, when the second touch selecting a specific variable point is detected, the pressurization information is received to the second touch, and the up and down movement gesture input is detected, the controller 170 determines that the shape change function execution request of the recognized figure is detected. In addition, when a pig tail gesture is mapped after a touch pressurization by the function execution command corresponding to the specific variable point, the controller 170 detects the second touch corresponding to the specific variable point, and determines that a deletion function execution request of the figure is detected when the gesture of the second touch is determined as the pig tail pattern.

In other words, the portable terminal 100 displays one or more variable points which are mapped with the specific function on the trajectory of the recognized figure in an editor mode, and may support to perform the specific function more conveniently and easily by commanding the controlling function execution of the mapped figure based on the pressure information of the touch pen and the gesture recognition information.

The controller 170 executes the controlling function of the figure corresponding to the variable point which is selected in response to the controlling function execution request of the figure (operation 280). The controller 170 controls the display unit 112 to output a screen according to the controlling function execution of the figure. For example, the controller 170 may change and display at least one of a size, a shape, a style, a color, an effect, a length, a movement, an addition, and a deletion of the recognized figure in response to the controlling function execution request of the figure. The controlling function execution screen of the figure is described later with reference to the drawings of FIG. 4 and below.

Next, when a third touch input is detected from an outer area of the recognized figure, the controller may release an output of the variable point which is displayed on the trajectory of the figure.

The portable terminal 100 may further include elements that haven't described hereinabove, such as a sensor module to detect information related to the position change of the portable terminal, a GPS module to measure a position of the portable terminal 100, and a camera module. In addition, depending on its providing type, it is obvious that the specific elements of the portable terminal 100 may also be excluded from the configuration, or may be replaced by other elements. Also, in the present disclosure, the input unit may be a touch pad and a track ball besides the described touch screen 110 and the key input unit 130.

Figure 3:
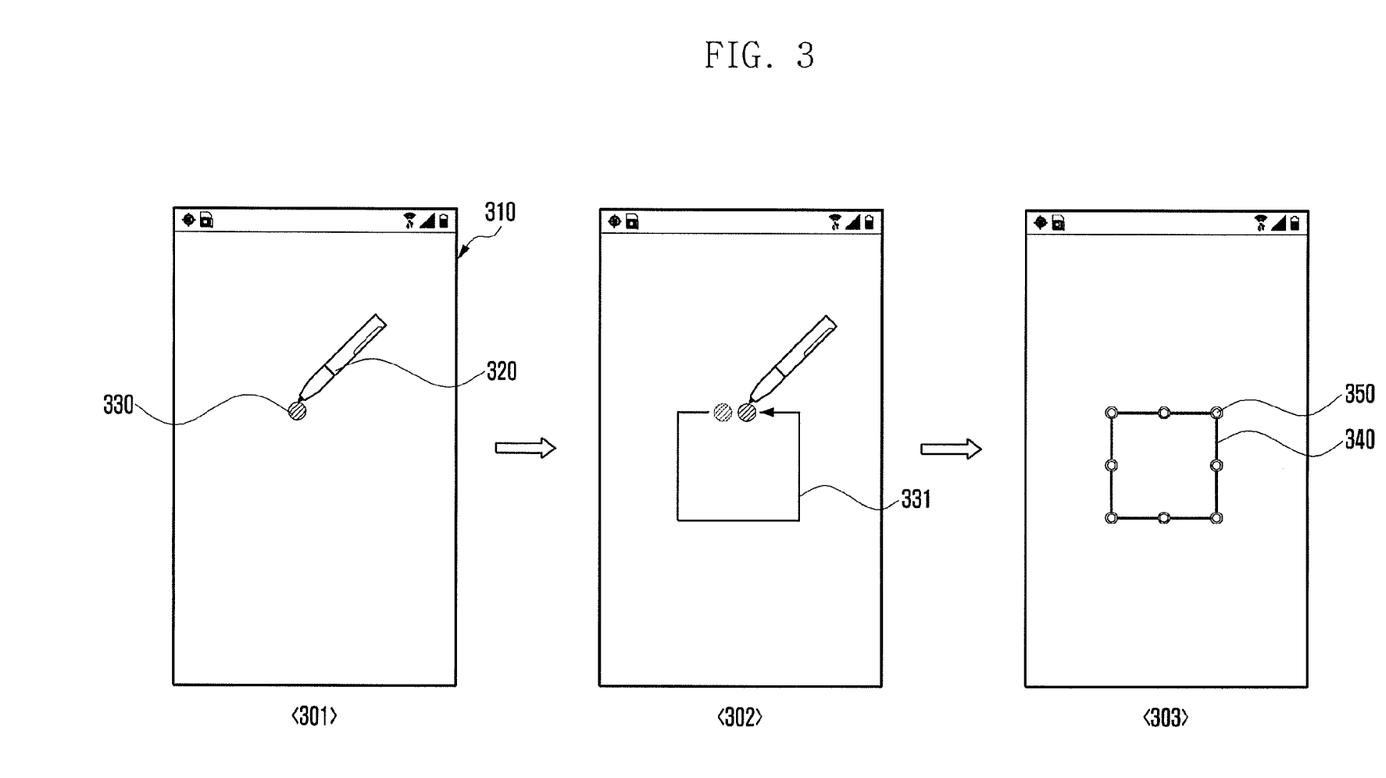
FIG. 3 is a diagram of a screen recognizing and displaying a handwriting figure according to an embodiment of the present disclosure.

FIG. 3 is a screen diagram that illustrates recognizing and displaying a handwriting figure according to an embodiment of the present disclosure.

Referring to FIG. 3, the portable terminal 100 may be operated in an editor mode. When it is operated in the editor mode, the display unit 112 displays a handwriting input screen 130 as illustrated in screen <301> under the control of the controller 170. In the editor mode, the controller 170 may control the pen touch panel as an activation state.

In such a state, the user may perform a handwriting input for the specific figure (e.g., a square shape) by performing a touch input movement in a contacting state to the display panel or a hovering state by using the touch pen 320. More specifically, the controller 170 displays a starting point 330 of a touch input by the touch pen on the display unit 112, and displays the trajectory 331 of the square shape according to the touch input operation as illustrated in screen <302> based on the starting point 330.

After the user performs the handwriting input for the square shape, and when the figure recognition function is executed, the controller 110 recognizes the square shape as a square. Under the control of the controller 170, the display unit 112 outputs one or more variable points on the trajectory of the recognized figure.

For example, under the control of the controller 1170, the display unit 112 may output 8 variable points 350 on the trajectory of the square 340 as illustrated in screen <303>. Here, the controlling function of the figure, for example, at least one of a shape change function, a color change function, a style change function, an effect change function of the figure, a figure addition function, a figure deletion function, a size change function, a movement function, and a length change function may be mapped to eight variable points.

The portable terminal 100 possibly changes the number of the variable points which are displaying according to the trajectory of the figure, and may output a guide window guiding the functions which are corresponding to the variable points for user's convenience, however, it is not limited thereto.

Figure 4:
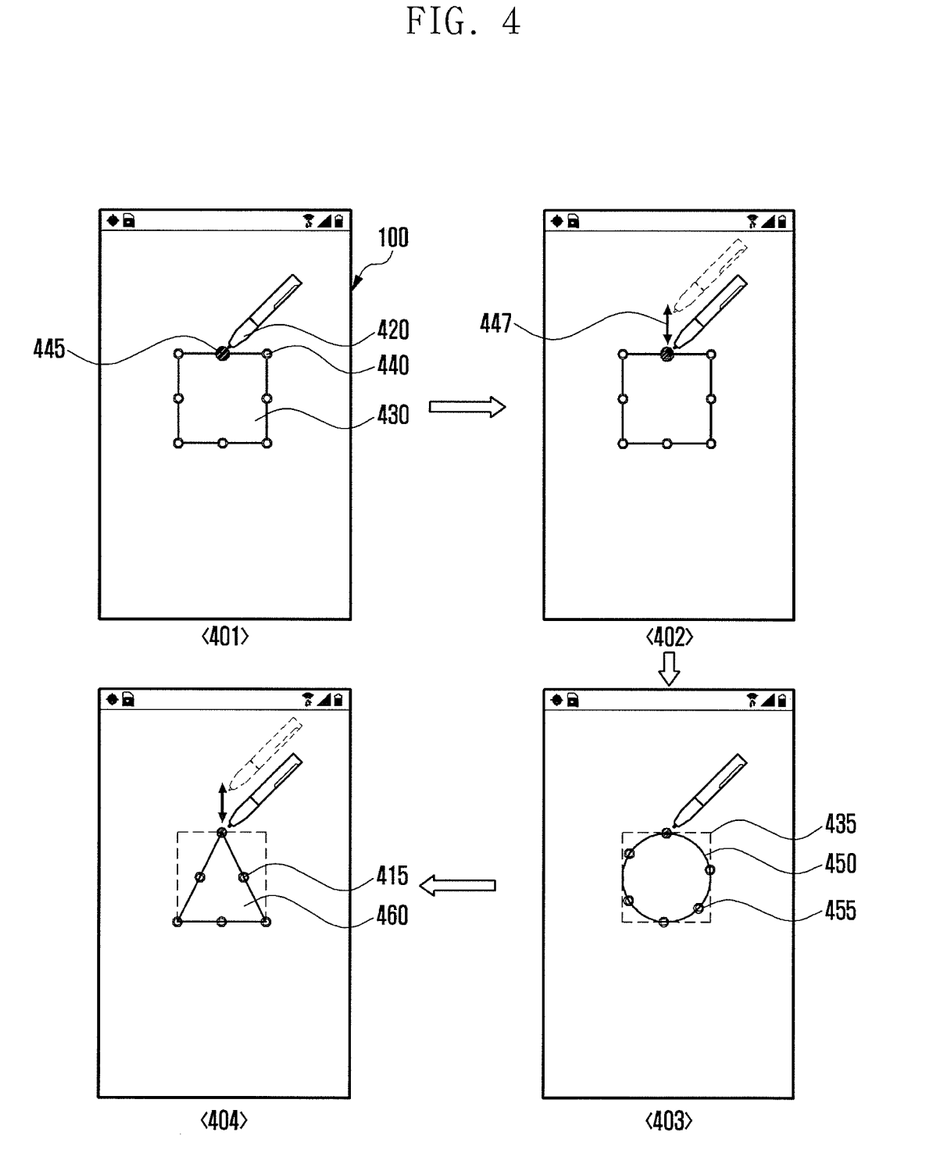
FIG. 4 is a diagram of a screen displaying an additional controlling function of a figure according to an embodiment of the present disclosure.

FIG. 4 is a diagram displaying an additional controlling function of a figure according to an embodiment of the present disclosure.

Referring to FIG. 4, under the control of the controller 170, the display unit 112 may output one or more variable points 440 on the trajectory of the recognized figure in a handwriting input screen 410 as illustrated in screen <401>. For example, the controller 170 may recognize a square 430 based on the handwriting input data by the touch pen 420.

In such state, the user selects a first variable point 445 among the variable points output by the touch pen 420, and may apply a pressure to the touch input selecting the first variable point 445. Then, the controller 170 receives a pressure information which is applied to the touch pen 420. The controller 170 may recognize the pressure movement of the user based on the pressure information received from the touch pen. The controller 170 may receive the pressure information from the touch pen, or may recognize a pressurization movement of the user from a capacitance information or a pressure sensor information.

The user may move the touch pen 420 to any one direction of up and down directions based on the first variable point 445 while applying the pressure to the touch pen 420. Then, the controller 170 executes a controlling function (e.g., a figure addition function) of the mapped figure corresponding to the first variable point 445.

In detail, as illustrated in screen <402>, the controller 170 executes the additional function of the figure when a pressurization of the touch selecting the first variable point 445 and a touch gesture which moves up and down are detected. Here, the controller 170 controls the display unit 112 to display the additional figure on the recognized square 430. For example, the controller 170 outputs the additional figure with a different type from the recognized figure. In this case, the trajectory of the recognized figure is output as a dotted line, and the trajectory of the additional figure may be output as a solid line; however, this is only an example to explain the disclosure, and it is not limited thereto. In other words, as illustrated in screen <403>, the controller 170 controls the display unit 112 to output the trajectory of the square as the dotted line 435, and output the additional figure, for example, the trajectory of a circle as the solid line 450. Here, the controller 170 controls to output one or more variable points on the trajectory of the circle, and may change and output the number of the variable points according to a shape of the figure.

In succession, when the user applies the pressure to the first variable point 445, and when it moves upward, the controller 112 controls the display unit 112 to output the additional figure as a different type of a figure. As illustrated in screen <404>, under the control of the controller 170, the display unit 112 changes and outputs a circle figure as a triangle in response to a touch gesture which is moved in the upward direction. In this case, the trajectory of the square 430 is output as a dotted line, and the trajectory of the triangle is output as a solid line 460. Here, the controller 170 controls to output one or more variable points on the trajectory of the triangle.

The display unit 112 may output a guide window which guides the controlling function of the figure corresponding to the variable point that is output according to the figure type, however, it is not limited thereto.

According to an embodiment of the present disclosure, one or more functions of the additional function of the figure and the deletion function of the figure may be mapped in the first variable point 445. In this case, when the touch gesture in the up and down directions based on the first variable point 445 is input after the pressure is applied to the touch, the additional function of the figure may be executed. Alternatively, in the deletion function execution command of the figure, the deletion function of the figure may be executed when the touch gesture of a pig tail shape is input based on the first variable point 445 after the pressure is applied to the touch.

The figure additional function execution may be applied to when moving the touch pen in the up and down directions based on the first variable point after touching the first variable point with the touch pen, however, it is not limited hereto.

Figure 5:
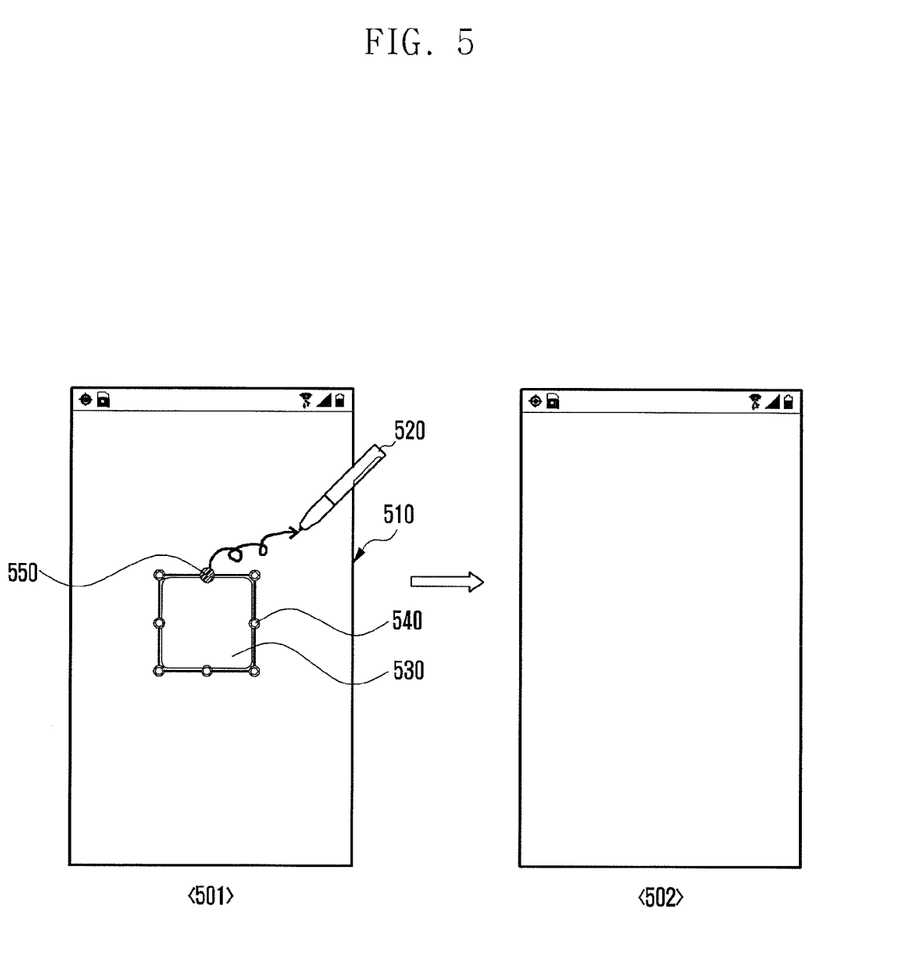
FIG. 5 is a screen interface displaying a deletion function of a figure according to an embodiment of the present disclosure.

FIG. 5 is a screen interface displaying a deletion function of a figure according to an embodiment of the present disclosure.

Referring to FIG. 5, as illustrated in screen <501>, the display unit 112 outputs one or more variable points 540 on the figure of the square which is recognized on a handwriting input screen 510. The controller 170 may recognize the square 530 based on the handwriting input data by the touch pen.

In such state, the user selects a first variable point 550 which is output in the middle of an upper segment of the square with the touch pen 520, and may move the touch pen 520 as a pig tail shape based on the first variable point 550 after applying a pressure. Then, as illustrated in screen <502>, the controller 170 executes a function deleting the recognized figure of the square.

The deletion function execution of the figure may be applied to the case when the touch pen is moved as the pig tail shape based on the first variable point after touching the first variable point with the touch pen; however, it is not limited thereto.

Figure 6:
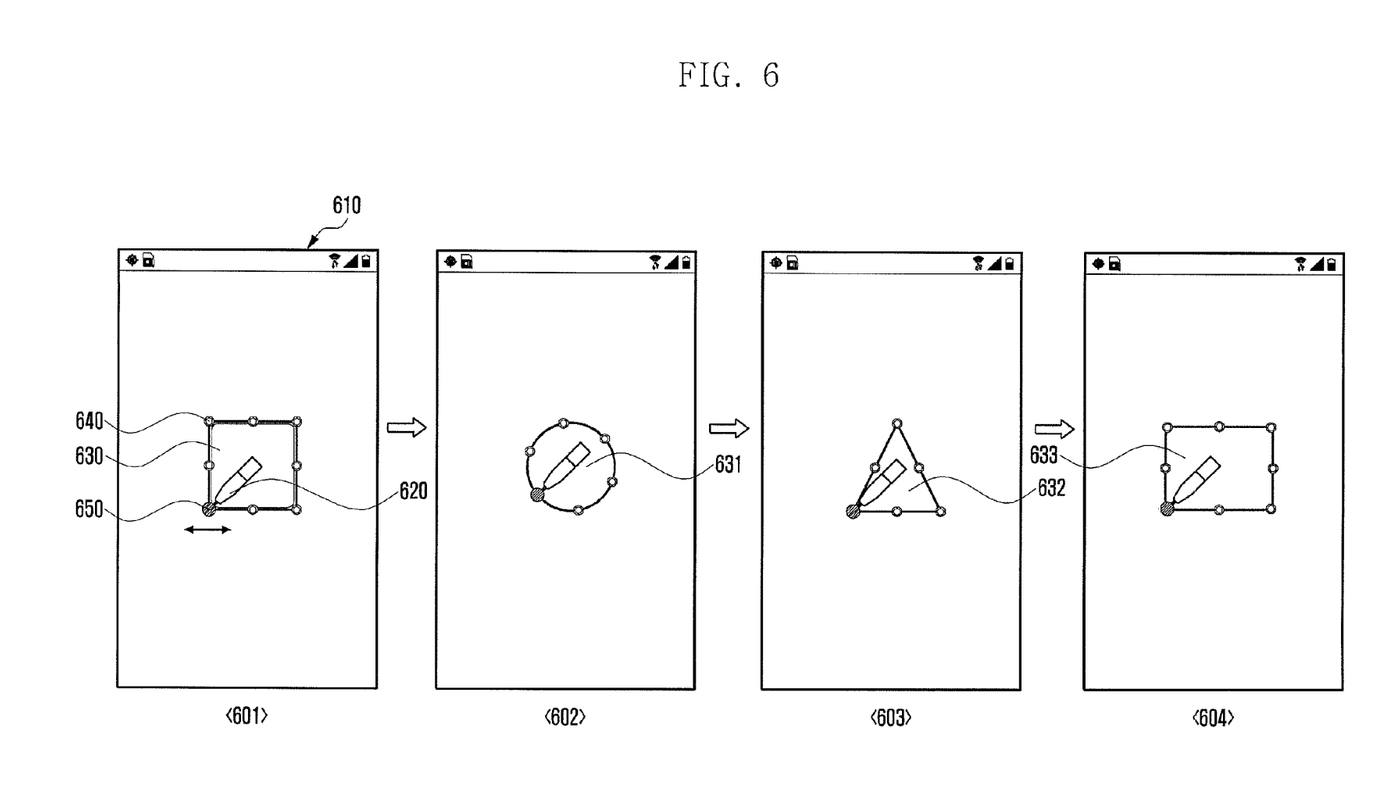
FIG. 6 is a screen interface displaying a shape change function of a figure according to an embodiment of the present disclosure.

FIG. 6 is a screen interface displaying a shape change function of a figure according to an embodiment of the present disclosure.

Referring to FIG. 6, under the control of the controller 170, the display unit 112 outputs one or more variable points 640 on the trajectory of the recognized square 630 on the handwriting input screen 610, as illustrated in screen <601>.

In such state, when the user touches a second variable point 650 in a lower left side of the square with the touch pen 620, and applies a pressure, the user may move it to one of the directions (e.g., lower side direction) among the up and down directions based on the second variable point. In this case, the function changing a shape of the figure may be mapped to the second variable point 650. Then, the controller 170 changes and outputs a shape of the recognized square as a different type. In other words, as illustrated in screen <602>, the controller 170 changes and outputs the square 630 as a circle 631, and outputs one or more variable points on the trajectory of the changed circle.

In succession, the user maintains the pressure movement for the point which corresponds to the second variable point 650 on the trajectory of the circle, and may move in the upward direction based on the second variable point 650. Then, under the control of the controller 170, the display unit 112 changes and outputs the circle 631 as the triangle 632, and outputs one or more variable points on the trajectory of the changed triangle, as illustrated in screen <603>.

In succession, the user maintains the touch pressure for the point which corresponds to the second variable point 650 on the trajectory of the triangle 632, and may move in the downward direction based on the second variable point 650. Then, under the control of the controller 170, the display unit 112 changes and outputs the triangle 632 as the square 633, and outputs one or more variable points on the trajectory of the changed square 633, as illustrated in screen <604>.

Here, under the control of the controller 170, the number of variable points which are output according to a shape change of the figure may be changed and output to the display unit 112, however, the position of the selected variable point only varies according to the shape change of the figure, and the variable point to the shape change function of the figure is mapped is not deleted.

The shape change execution command of the figure may be applied to when the pressure is maintained in the second variable point during the preset time, or when the touch gesture in the up and down directions is input after the variable point is selected. For example, when the selection input corresponding to the second variable point is detected, and when the pressure corresponding to the second touch is maintained for 2 seconds, the square is changed into the circle to display, and when the touch pressure is maintained again for 2 seconds, the circle may be changed into the triangle to display.

Figure 7:
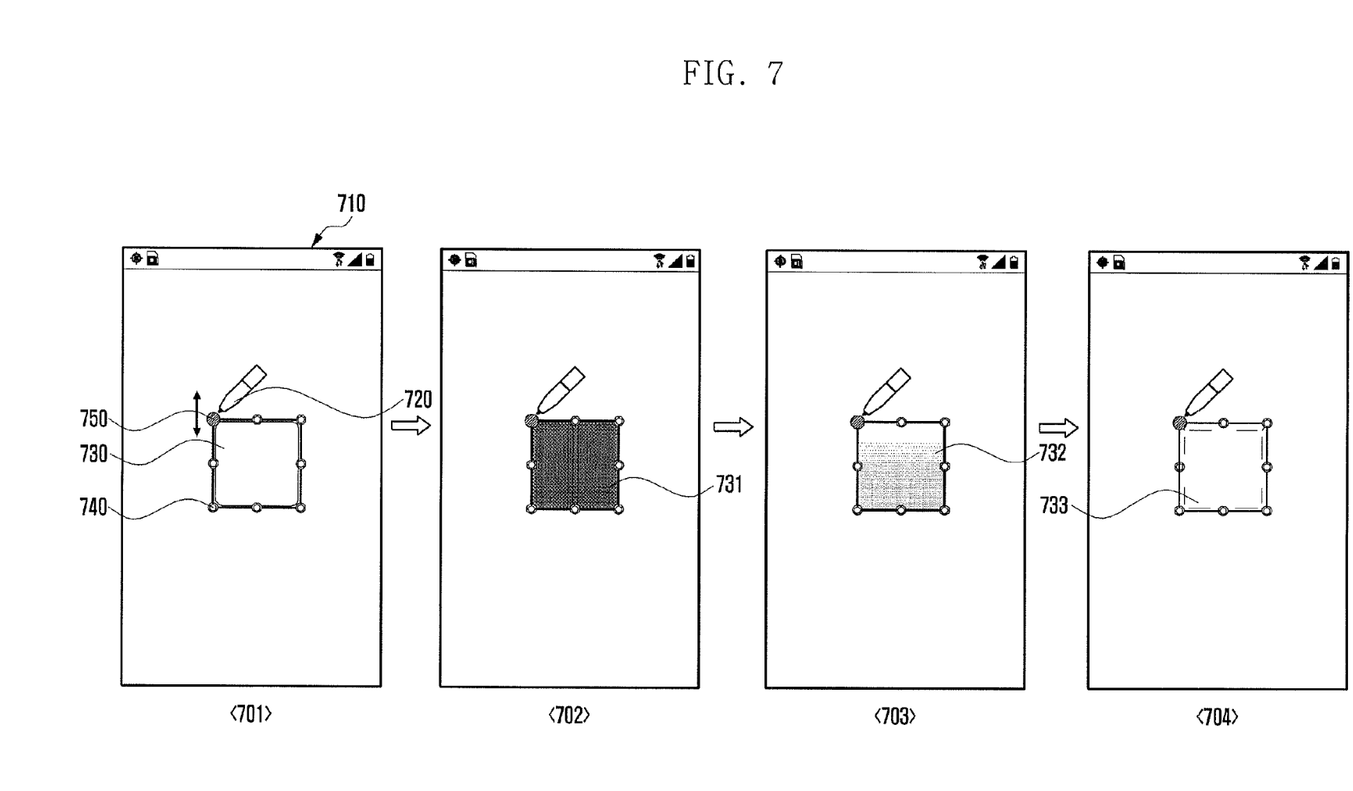
FIG. 7 is a screen interface displaying a style change function of a figure according to an embodiment of the present disclosure.

FIG. 7 is a screen interface displaying a style change function of a figure according to an embodiment of the present disclosure.

Referring to FIG. 7, under the control of the controller 170, the display unit 112 outputs one or more variable points 740 on the trajectory of the recognized square 730 on a handwriting input screen 710, as illustrated in screen <701>.

In such state, the user touches a third variable point 750 which locates on the upper left side of a square with a touch pen 720, and after applying the pressure with the touch pen 720, the user may move it in an up or down direction (e.g., in the upward direction) based on the third variable point 750. In this case, the function changing the style of the figure may be mapped to the third variable point 750 of the square.

Then, the controller 170 changes and outputs the style of the square 730 as a first style in response to a style change function execution request. In other words, as illustrated in screen <702>, under the control of the controller 170, the display unit 112 displays with a first style 731 that a specific color is output in the square 730, and outputs one or more variable points on the trajectory of the square which is changed to the first style. When the function execution request corresponding to another variable point to which the color change function is mapped among the variable point of the square which is displayed as the first style is detected, the controller 170 may change and output the color of the square.

In succession, the user maintains the pressure movement corresponding to the third variable point on the trajectory of the square which is changed to the first style, and may move in the downward direction based on the third variable point. Then, under the control of the controller 170, as illustrated in screen <703>, the display unit 112 changes the square which is displayed as the first style into the second style to output.

In succession, the user maintains the pressure operation corresponding to the third variable point on the trajectory of the square, and may move to the upward direction based on the third variable point. Then, under the control of the controller 170, the display unit 112 changes the square which is changed to the second style into the third style to output, as illustrated in a screen <704>.

In the present disclosure, under the control of the controller 170, the display unit 112 outputs one or more variable points on the trajectory of the square according to the style change of the figure. Here, the style of the figure refers to a line change of the figure and a figure color change. In other words, under the control of the controller 170, the display unit 112 may change at least one of a line thickness, a line shape, and a color change of the figure when a figure style change execution request signal is detected for the third variable point.

The style change execution command of the figure may also be applied when the pressure which is applied to the third variable point during the preset time is maintained, or when the touch gesture in the up and down directions is input after selecting the third variable point. For example, when a selection input corresponding to the third variable point is detected, and a pressure movement to the second touch is maintained for 2 seconds, and when a square of the first style is changed into the square of the second style to display, and the pressure operation is maintained again for 2 seconds, the square of the second style may be changed into the square of the third style to display. The user may stop the pressure movement when the desired style of the figure is output.

Figure 8:
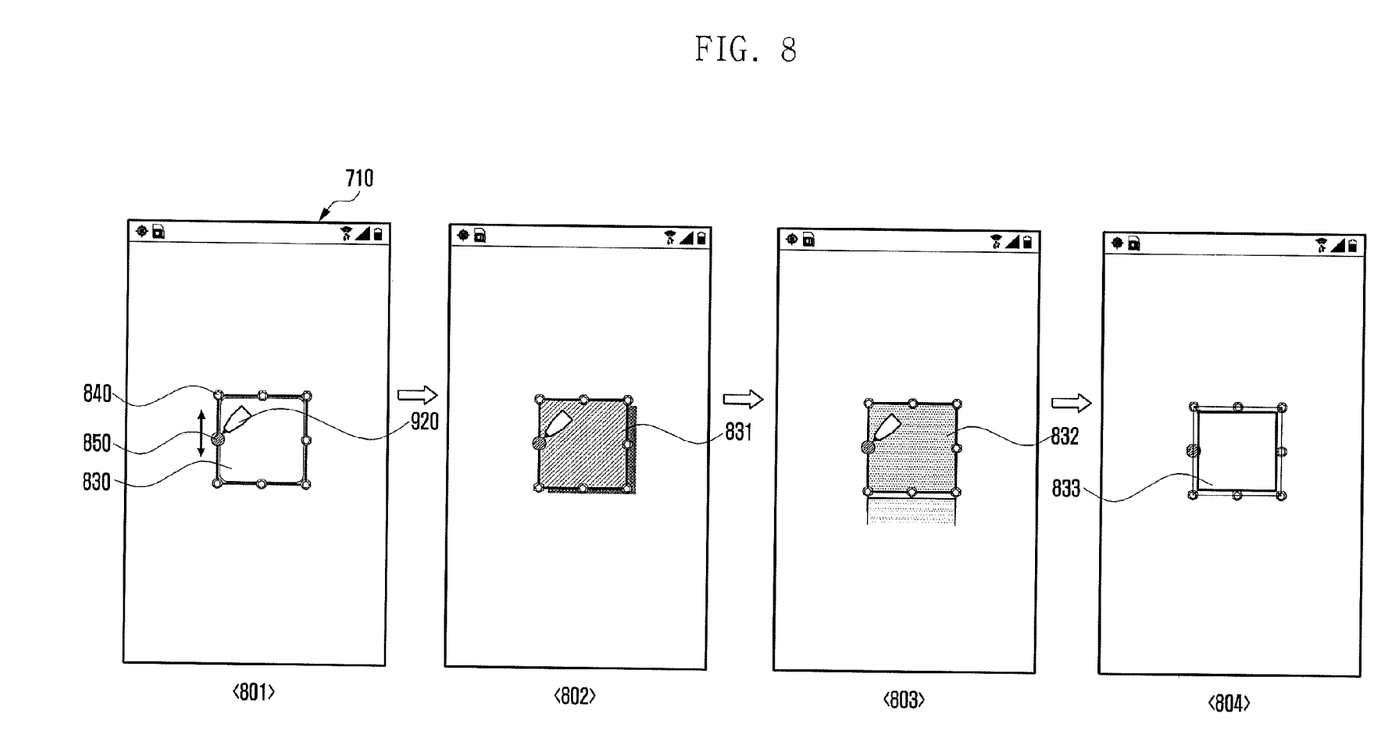
FIG. 8 is a screen interface displaying an effect change function of a figure according to an embodiment of the present disclosure.

FIG. 8 is a screen interface displaying an effect change function of a figure according to an embodiment of the present disclosure.

Referring to FIG. 8, under the control of the controller 170, the display unit 112 outputs one or more variable points 840 on the trajectory of the square 830 recognized from a handwriting input screen 810 as illustrated in screen <801>.

In such state, the user touches a fourth variable point 850 which is output in a middle of a left side segment of the square with the touch pen 820, and may move in the up or down direction (e.g., upward direction) based on the fourth variable point 850 after applying the pressure with the touch pen 820. In this case, a function changing an effect of a figure may be mapped to the fourth variable point 850 of the square.

Then, the controller 170 changes the recognized square 830 into a square 831 of a first effect to output in response to an effect change function execution request. In other words, as illustrated in screen <802>, under the control of the controller 170, the display unit 112 changes the square 830 into the square 831 of the first effect where a shadow effect is output to display, and outputs one or more variable points on the trajectory of the changed square.

In succession, the user maintains the pressure movement corresponding to the fourth variable point 850 from the trajectory of the square 831 which is changed to the first effect, and may move to the downward direction based on the fourth variable point 850. Then, under the control of the controller 170, the display unit 112 changes into a square 832 of a second effect where a mirror effect is output and displays the changed square, as illustrated in a screen <803>.

In succession, the user maintains the pressure movement corresponding to the fourth variable point 850 from the trajectory of the square, and may move in the upward direction based on the fourth variable point 850. Then, under the control of the controller 170, as illustrated in screen <804>, the display unit 112 changes into a square of a third effect 833 where a three-dimensional effect is output and outputs the changed square. Here, the effect of the figure refers to an external change of the figure.

The effect change execution command of the figure may also be applied to when the pressure which is applied to the fourth variable point during the preset time is maintained, or when the touch gesture in the up and down directions is input after selecting the fourth variable point. For example, when a selection input corresponding to the fourth variable point is detected and a pressure movement is maintained for 2 seconds, a square of the first effect is changed into a square of a second effect to display, and when the pressure movement is maintained again for 2 seconds, the square of the second effect may be changed into a square of a third square to display. The user may stop the pressure movement when the desired effect of the figure is output.

Figure 9:
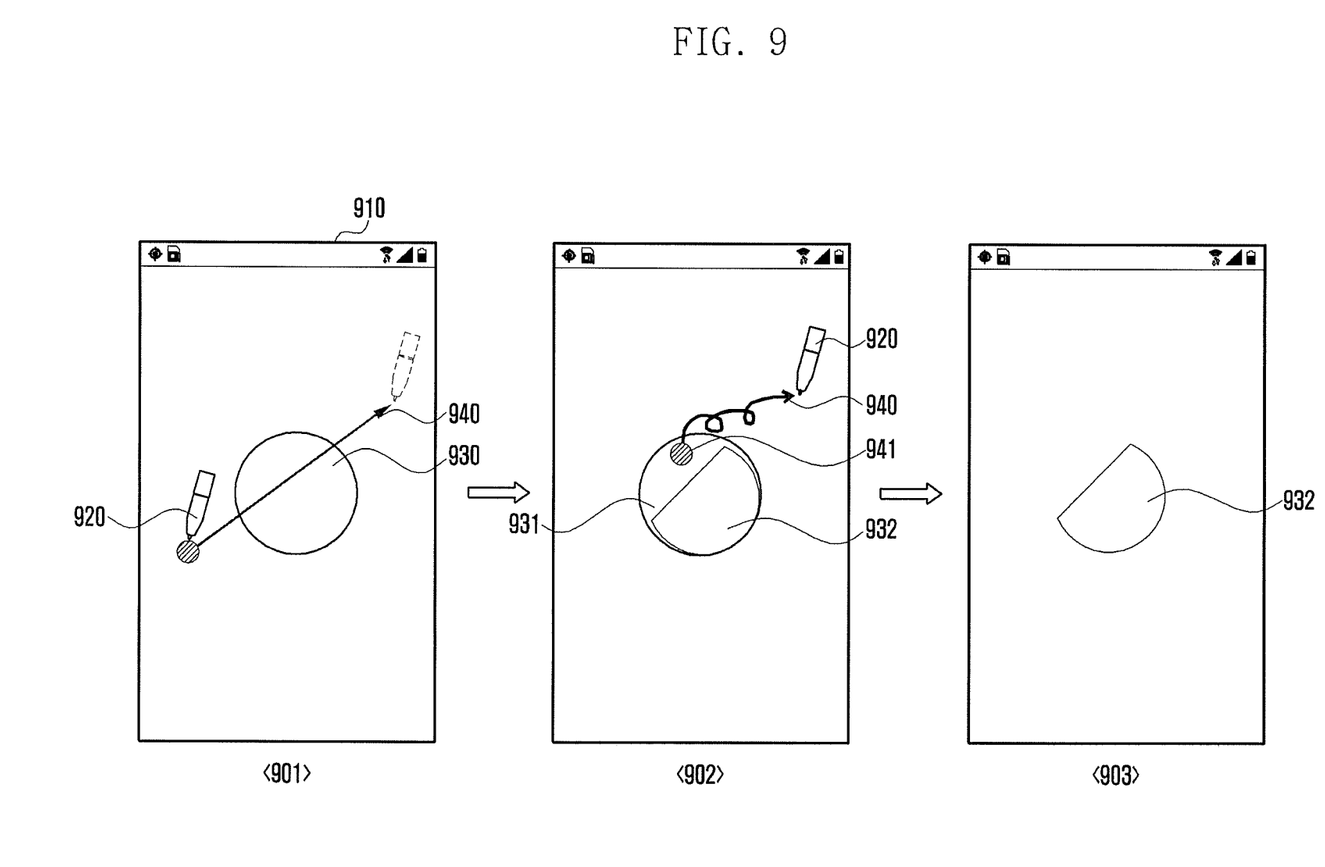
FIG. 9 is a screen interface displaying a cutting function of a figure according to an embodiment of the present disclosure.

FIG. 9 is a screen interface displaying a cutting function of a screen according to an embodiment of the present disclosure.

Referring to FIG. 9, under the control of the controller 170, the display unit may output a circle figure 930 recognized based on a handwriting input data by the touch pen from a handwriting input screen 910. Here, one or more variable points may be output on the trajectory of the circle. The controller 170 may release a mark of a variable point when a touch is detected from an external area of the recognized figure after outputting the variable point by recognizing the figure.

Here, in order to output a shape of the circle randomly, the user touches one point of the external area of the circle with the touch pen 920, and may move the touch pen to pass through a part of the circle. Then, the controller 170 outputs the trajectory 940 of a touch movement in response to the touch movement passing through the part of the circle.

When the touch movement is detected to be completed, the controller 170 controls the display unit 112 to split and display the circle into a first area 941 and a second area 942 based on the trajectory passing through the part of the recognized figure as illustrated in screen <902>.

In succession, the user may touch the first area 941 of the split area of the figure with the touch pen 920, and move the touch pen 920 with a pig tail shape 941. Then, the controller 170 executes a function deleting the first area, and controls the display unit to output only the second area of the circle 932 as illustrated in screen <903>.

According to the present disclosure, after recognizing the figure which is handwritten input on the touch screen, one or more variable points to which the controlling function of the figure is mapped are displayed on the trajectory of the figure, and the controlling function of the figure which is mapped to the variable point selected based on the pressure of the touch and the touch movement selecting one of the variable points may be executed. The present disclosure has an effect of providing convenience and fun when controlling the figure by providing a figure controlling interface like using a real pen to the user who uses the portable terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a figure, the method comprising:
   recognizing a figure which is input by handwriting on a touch screen;
   displaying one or more variable points to which a controlling function of a figure is mapped on a trajectory of the recognized figure;
   detecting a touch input that selects one of the variable points;
   determining whether a controlling function execution request of the recognized figure is detected based on at least one of a pressure information and a touch gesture information corresponding to the detected touch input; and
   executing the controlling function of the figure corresponding to the selected variable points when the controlling function execution request is detected.

2. The method of claim 1, wherein executing the controlling function of the figure comprises:
   executing a controlling function command of a figure which is mapped to the selected variable point; and
   executing at least one of an addition, a deletion, a shape change, a style change, an effect change, a color change, a size change, and a length change function of the recognized figure according to the execution.

3. The method of claim 1, wherein deter mining whether the controlling function execution request is detected comprises:
   detecting a touch gesture corresponding to the touch input; and
   detecting the controlling function execution request when the touch gesture corresponds to a preset function execution gesture.

4. The method of claim 1, wherein determining whether the controlling function execution request is detected comprises:
   detecting a touch pressure information corresponding to the touch input;
   detecting the touch gesture when a touch gesture input movement generates within a certain period of time after detecting the touch pressure; and
   detecting the controlling function execution request when the touch gesture corresponds to a preset functional execution gesture.

5. The method of claim 1, wherein executing the controlling function of the figure comprises changing the number of the variable points according to a shape of the figure in which the operational function is executed to output.

6. The method of claim 1, wherein executing the controlling function of the figure comprises:
outputting a first changed figure according to a first option of the controlling function in response to a first touch gesture when the first touch gesture is input;
outputting a second changed figure according to a second option of the controlling function in response to a second touch gesture when the second touch gesture is input; and
outputting a third changed figure according to a third option of the controlling function in response to a third gesture when the third touch gesture is input.

7. The method of claim 1, further comprising:
releasing a mark of the variable point when a touch generates from an external area of the recognized figure.

8. The method of claim 1, further comprising:
detecting a touch gesture passing through a part of the recognized figure in an external area of the recognized figure;
splitting and displaying the recognized figure according to a touch gesture in response to the detected touch gesture; and
executing a function of deleting the selected area when a deletion function execution request gesture is detected with respect to a touch selecting one area among the split area of the figure.

9. An apparatus for controlling a figure, the apparatus comprising:
a touch screen configured to detect a handwriting input during operation of an editor mode, and display an input effect corresponding to the handwriting input; and
a controller configured to control to recognize a figure input by a handwriting on the touch screen, display one or more variable points to which a controlling function of a figure is mapped on a trajectory of the recognized figure, detect a controlling function execution request of the recognized figure based on at least one of a pressure information and a touch gesture information corresponding to a touch input when a touch input that selects one of the variable points is detected, and execute the controlling function of the figure corresponding to the selected variable point in response to the function execution request.

10. The apparatus of claim 9, wherein the touch screen further comprises:
a touch pen panel and a touch panel configured to detect the handwriting input; and
a display unit configured to display a trajectory according to the handwriting input, and display a figure where the controlling function of the figure is executed.

11. The apparatus of claim 9, wherein the display unit displays at least one of a functional execution effect of an addition, a deletion, a shape change, a style change, an effect change, a color change, a size change, a length change, and a movement of the figure recognized according to the functional execution command under the control of the controller in the editor mode.

12. The apparatus of claim 9, wherein the controller controls to change and output a number of the variable points according to a shape of the figure which is output on the touch screen.

13. The apparatus of claim 9, wherein the controller outputs a first changed figure according to a first option of the controlling function in response to a first touch gesture when the first touch gesture is detected, outputs a second changed figure according to a second option in response to a second touch gesture when the second touch gesture is detected, and outputs a third changed figure according to a third option in response to a third touch gesture when the third touch gesture is detected.

14. The apparatus of claim 9, wherein the controller controls to release a mark of the variable point when a touch generates from an external area of the recognized figure.

15. The apparatus of claim 9, wherein the controller controls to split and display the recognized figure in response to the detected touch gesture when the touch gesture passing through a part of the recognized figure is detected from an external area of the recognized figure, and delete the selected area when a deletion functional execution request gesture is detected for a touch selecting one area among the split areas.

16. A portable terminal configured for controlling a figure, the portable terminal comprising:
a wireless communication unit;
a touch screen configured to detect a handwriting input during operation of an editor mode, and display an input effect corresponding to the handwriting input; and
a controller configured to control to recognize a figure input by a handwriting on the touch screen, display one or more variable points to which a controlling function of a figure is mapped on a trajectory of the recognized figure, detect a controlling function execution request of the recognized figure based on at least one of a pressure information and a touch gesture information corresponding to a touch input when a touch input that selects one of the variable points is detected, and execute the controlling function of the figure corresponding to the selected variable point in response to the function execution request.

17. The portable terminal of claim 16, wherein the touch screen further comprises:
a touch pen panel and a touch panel configured to detect the handwriting input; and
a display unit configured to display a trajectory according to the handwriting input, and display a figure where the controlling function of the figure is executed.

18. The portable terminal of claim 16, wherein the display unit displays at least one of a functional execution effect of an addition, a deletion, a shape change, a style change, an effect change, a color change, a size change, a length change, and a movement of the figure recognized according to the functional execution command under the control of the controller in the editor mode.

19. The portable terminal of claim 16, wherein the controller controls to change and output a number of the variable points according to a shape of the figure which is output on the touch screen.

20. The portable terminal of claim 16, wherein the controller outputs a first changed figure according to a first option of the controlling function in response to a first touch gesture when the first touch gesture is detected, outputs a second changed figure according to a second option in response to a second touch gesture when the second touch gesture is detected, and outputs a third changed figure according to a third option in response to a third touch gesture when the third touch gesture is detected.

* * * * *